United States Patent
Southward et al.

[11] Patent Number: 6,049,746
[45] Date of Patent: Apr. 11, 2000

[54] END STOP CONTROL METHOD

[75] Inventors: Steve C. Southward, Apex; Kenneth A. St. Clair, Cary, both of N.C.

[73] Assignee: Lord Corporation, Cary, N.C.

[21] Appl. No.: 09/053,441

[22] Filed: Apr. 1, 1998

[51] Int. Cl.[7] .................................................. B60G 17/00
[52] U.S. Cl. ........................... 701/37; 280/5.514; 701/39
[58] Field of Search .................................. 701/37, 38, 39; 280/5.5, 5.514, 5.515, 5.516

[56] References Cited

U.S. PATENT DOCUMENTS

| | | | |
|---|---|---|---|
| 3,807,678 | 4/1974 | Karnopp et al. | 248/358 R |
| 4,452,329 | 6/1984 | Stone et al. | 180/89.15 |
| 4,821,849 | 4/1989 | Miller | 188/280 |
| 4,881,172 | 11/1989 | Miller | 364/424.05 |
| 4,887,699 | 12/1989 | Ivers et al. | 188/378 |
| 4,936,425 | 6/1990 | Boone et al. | 188/299 |
| 4,949,573 | 8/1990 | Wolfe et al. | 73/118.1 |
| 5,276,622 | 1/1994 | Miller et al. | 701/37 |
| 5,276,623 | 1/1994 | Wolfe | 701/37 |
| 5,475,539 | 12/1995 | Townend | 701/38 |
| 5,582,385 | 12/1996 | Boyle et al. | 248/550 |
| 5,652,704 | 7/1997 | Catanzarite | 701/49 |
| 5,712,783 | 1/1998 | Catanzarite | 701/37 |

*Primary Examiner*—William A. Cuchlinski, Jr.
*Assistant Examiner*—Edward Pipala
*Attorney, Agent, or Firm*—Randall S. Wayland; James W. Wright; Wayne W. Rupert

[57] ABSTRACT

A method for controlling end stop collisions in electromechanical systems including dampers or actuators. In a first aspect, a velocity-squared control method determines an end stop control signal ($V_{end\ stop}$) based, at least in part, upon a square of the relative velocity ($V_{inst}$). Preferably, the displacement ($\delta_{end}$) to the end stop is also used to derive the end stop control signal ($V_{end\ stop}$). In another aspect, a snubber control method is employed which produces a snubber control signal ($V_{snub}$) based, at least in part, upon a continuous function of a snubber incursion distance ($\delta_z$) within a snubber zone (Z). Preferably, the velocity-squared end stop and the snubber control methods operate together. When used in conjunction with an end stop control method, the snubber control method prevents end stop collisions for cases where the end stop control algorithm alone would not. Either of the end stop methods (the velocity-squared end stop control method or the snubber control method) may be used alone, in combination with each other, or in combination with a primary control method.

26 Claims, 13 Drawing Sheets

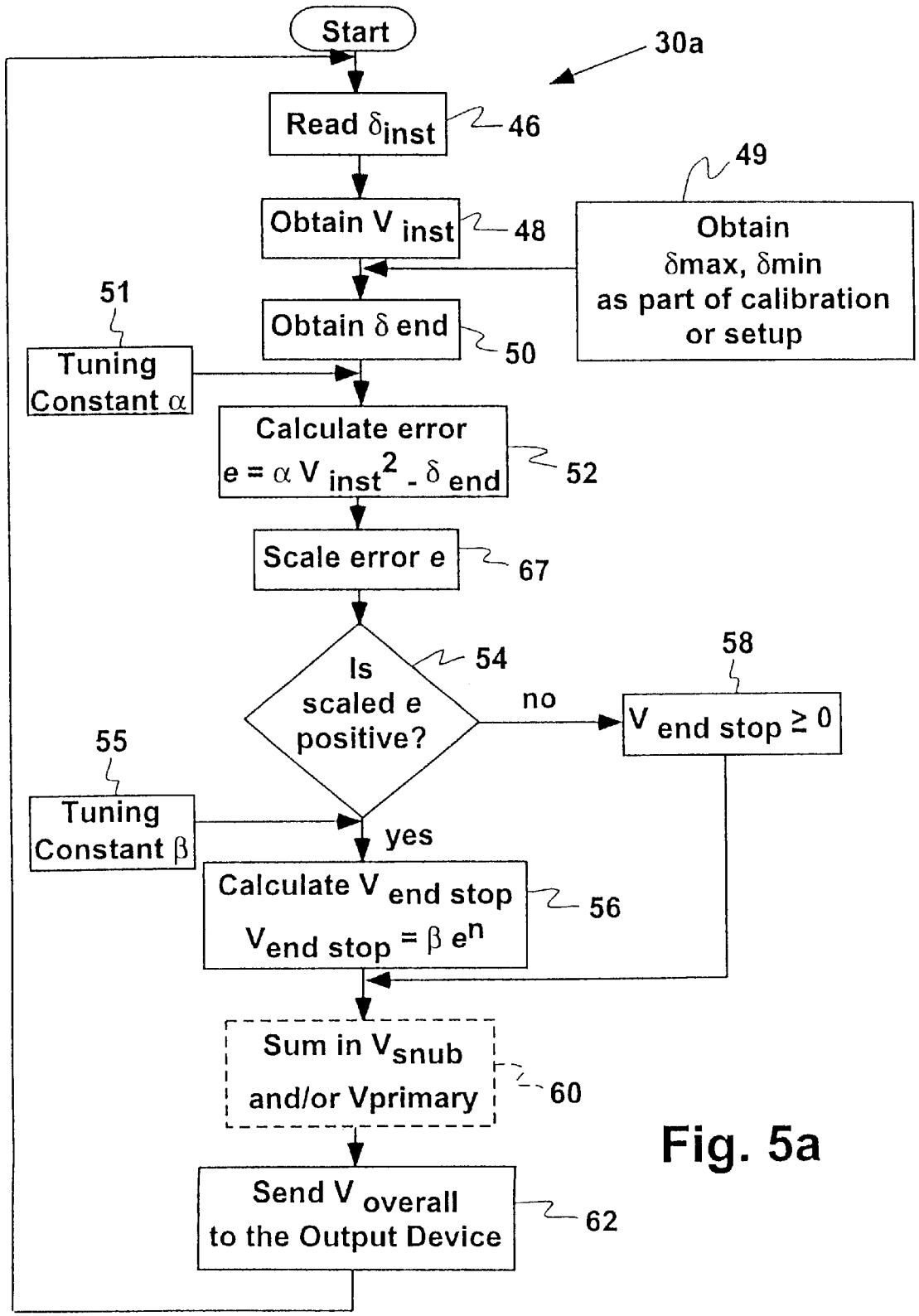

END STOP CONTROL METHOD

FIELD OF THE INVENTION

This invention relates to the area of control methods. More specifically, it relates to methods for minimizing the occurrence of end stop collisions in a system including a controllable force device.

BACKGROUND OF THE INVENTION

Various methods have been employed to control vibration in suspension systems. For example, primary control methods such as "Skyhook Control" described in U.S. Pat. No. 3,807,678 to Karnopp et al., "Relative Control" described in U.S. Pat. No. 4,821,849 to Miller, "Observer Control" described in U.S. Pat. No. 4,881,172 to Miller, "Continuously Variable Control" as described in U.S. Pat. No. 4,887,699 to Ivers et al., "Delayed Switching Control" described in U.S. Pat. No. 4,936,425 to Boone et al., "Displacement Control" as described in U.S. Pat. No. 5,276,623 to Wolfe, "Rate Control" as described in U.S. Pat. No. 5,652,704 to Catanzarite and Modified Rate Control" as described in U.S. Pat. No. 5,712,783 to Catanzarite are used to determine the appropriate primary control signal to an electro-mechanical device, such as a controllable damper based upon various sensor inputs.

Under certain conditions, some or all of these primary control methods will result in abrupt collisions with the end stops (hereinafter referred to as "end stop collisions"). An end stop collision is where the mechanical system in which the damper is connected hits the end stops, i.e., the maximum mechanical limits of the extension and/or rebound strokes when a sufficient transient load is encountered. Generally, there are hard stops that are designed into the system, such that the damper itself does not see the brunt of the shock. However, if the system velocity is high enough when the end stop collision occurs, a very disconcerting rapid impact can occur. Of course, this bottoming and topping out imparts unwanted stresses to the mechanical components in the system (ex. linkages, swing arms, bushings, joints, etc.) and is detrimental to the system's overall life. Moreover, such collisions can be an annoyance to the driver.

By way of more explanation, the suspension system being controlled generally includes an electro-mechanical device (ex. a controllable orifice damper, a magnetorheological damper or an electrorheological damper, etc.) which is attached between two relatively moveable members. The device's damping is controlled to minimize vibration, but also to avoid end stop collisions. For example, in a controllable damper suspension system, a variable damper is attached between two relatively moveable system components, such as a vehicle chassis and suspension or, alternatively, between a vehicle seat and a structural body. One or more sensors provide information regarding the movement of the components of system, ex. relative or absolute displacement, velocity or acceleration. The damping characteristics of the damper are then controlled in accordance with any of the afore-mentioned primary control methods. The control may also include an overriding end stop control method.

An end stop control method is a method which operates in conjunction with, or in the background of, the primary ride control method (such as those mentioned above) to override or modify the primary control instructions should it be determined that an end stop collision is imminent or likely. Generally, the signal from the primary control and the signal generated from the end stop control are additive. One very effective end stop method which has been employed is described in U.S. Pat. No. 5,276,622 to Miller et al. entitled "System for Reducing Suspension End-Stop Collisions". The overall control signal $V_{overall}$, which includes contributions from the primary control method and end stop control method, provides a digital signal value which is generally converted to an output voltage or current. This control signal to the damper includes primary control inputs $V_{primary}$ and end stop control inputs $V_{end\ stop}$. This overall control signal $V_{overall}$ provided to the damper is represented by:

$$V_{overall} = V_{primary} + V_{end\ stop}$$

where:

$V_{overall}$ = the overall command signal to the damper, $V_{primary}$ = the portion of the signal due to the primary control method, and $V_{end\ stop}$ = the portion of the signal due to the end stop control method.

It should be recognized that if it is determined by the end stop control method that an end stop collision is unlikely, then $V_{end\ stop}$ is set to equal zero. Thus, under this scenario, the overall damper control signal $V_{overall}$ is dictated by the primary control method only.

In a preferred implementation described in the Miller et al. '622 patent, the end stop control method calculates a maximum allowable relative velocity Vrm based upon available data and/or inputs such as relative velocity and relative displacement (see col. 10 of the '622 Miller patent). In the simplest form of the preferred implementation of Miller, the method comprises three steps.

Step 1: Determine the positive distance to the appropriate end-stop limit based on the direction of motion. The positive distance is given by $$\delta_{end} = \delta_{max} - \delta_{inst} \text{ when } V_{inst} > 0$$

$$\delta_{end} = \delta_{inst} - \delta_{min} \text{ when } V_{inst} < 0$$

Step 2: Determine an "error" value (e) according to the relation $$e = \text{Abs}(\alpha V_{inst}) - \text{sqrt}(\delta_{end})$$

where $\alpha$ = a tuning constant, $V_{inst}$ = the instantaneous relative velocity, and $\delta_{end}$ = the distance to the nearest end stop limit.

Step 3: Determine the end stop control signal $V_{end\ stop}$ which is preferably added to the primary control signal $V_{primary}$ for damper-like output devices.

$$V_{end\ stop} = \beta e \quad \text{when } e > 0$$

$$V_{end\ stop} = 0 \quad \text{when } e > 0$$

where $\beta$ = a tuning constant.

The Miller '622 end stop method includes two signal inputs: 1) the relative displacement $\delta_{inst}$, and 2) the relative velocity $V_{inst}$. Using an output signal from a position sensor whose output is indicative of the relative displacement $\delta_{inst}$, a relative velocity $V_{inst}$ estimate is obtained from passing the signal through a well-known "differentiation" filter, such as a "Rate" filter or by taking a simple "Euler derivative".

The Miller '622 end stop method also requires the specification of two positive constant parameters: $\alpha$ and $\beta$. The $\beta$ parameter is simply a gain which increases or decreases the amount of end stop control present. The constant $\alpha$ determines the parabolic shape of the control surface. Both parameters are tuning parameters which are set based upon trial and error. As best shown in FIG. 3a, it can be readily seen that the shape of the end-stop control surface causes system trajectories to be re-directed away from most end-stop collisions, i.e., an increase in the end stop control signal causes an increase in the current which concomitantly increases damping applied. The increased damping, in turn, causes a decrease in the magnitude of the relative velocity $V_{inst}$.

For example, referring to FIG. 3a, if the displacement were about 0.75 inch and the velocity were about 40 in/sec, as indicated by point 37 on the control surface 38, the end stop control would accordingly deliver the current I in amps such that the damping is increased. This, of course, will attempt to avoid a hard end stop collision. Moreover, it should be recognized that when operating within the confines of the flat bottom 40 of the control surface 38, no end stop control signal is commanded. However, there still may be current to the damper from the primary control method. See for example, FIG. 3b which illustrates the control surface 38a for the previously mentioned "Rate Control" method as described in U.S. Pat. No. 5,652,704 to Catanzarite.

It should also be recognized that in the preferred implementation of the Miller '622 patent, a computation of a square root function is required to determine Vrm. Vrm is the velocity above which an end stop collision is imminent (see FIG. 4, block 210 of Miller '622). Determining a square root calculation in either a fixed point or floating point processor is very computationally expensive thereby requiring an expensive microprocessor. Further, square root calculations require significant memory resources, thus adding unwanted cost and complexity to the system.

Moreover, for certain conditions, such as where relative velocities are low, it is possible to have an end stop collision even though the overriding end stop method is present and operational. For example, when a user gets off of an air spring suspended seat including a controllable damper suspension, such as is described in U.S. Pat. No. 5,652,704 to Catanzarite entitled "Controllable Seat Damper System And Control Method Therefor", the seat tends to be driven to the top of its travel limit at a low, yet still significant velocity. This is an example of what will be referred to herein as a low-velocity, high-displacement condition. This causes an unwanted jarring impact to the seat system components. Notably, this is because the preferred implementation of the '622 Miller end stop control patent is incapable of preventing collisions in the area of the control surface. approximately designated as 42 (FIG. 3a). This is because there is only a small ramp up in current which is too little and too late to avoid a collision.

Therefore, there is a long felt, and unmet, need for a simple and cost effective method(s) for further avoiding end stop collisions in controllable systems.

SUMMARY OF THE INVENTION

In light of the advantages and drawbacks of the prior art, the present invention is directed to improved methods for reducing end stop collisions. In a first aspect, the present invention is directed to a novel velocity-squared end stop method which is more efficient than prior art end stop control methods. In a second aspect, the present invention is directed to a novel snubber control method which reduces end stop collisions which take place in the prior art even though an end stop method is operational. Preferably, the novel snubber control method is used in combination with an end stop method, such as the velocity-squared end stop method, to provide a combined method which is more efficient that prior art and that reduces the severity and/or number of end stop collisions.

In another aspect, the snubber control and velocity-squared end stop methods are preferably used in conjunction with a primary control method. However, it should be understood that either method, i.e., the velocity-squared end stop or the snubber control method may find application by itself.

The velocity-squared end stop control method in accordance with the present invention comprises the steps of:
(a) determining an instantaneous relative velocity ($V_{inst}$) based upon a sensor output from at least one sensor,
(b) calculating an error value based at least in part upon a square of the instantaneous relative velocity ($V_{inst}$),
(c) calculating an end stop control signal ($V_{end\ stop}$) based upon the error value (e), if the error value (e) is positive,
(d) providing the end stop control signal ($V_{end\ stop}$) to an output device, and
(e) repeating steps (a) through (d).

In a further aspect of the velocity-squared method, the invention includes setting the end stop control signal $V_{end\ stop}$ equal to zero if the error value (e) is negative. Preferably also, the method includes the additional step of obtaining an end stop distance $\delta_{end}$ to an end stop limit based upon the sensor output, the error value e being at least in part calculated from the end stop distance $\delta_{end}$. Even more preferably, the error value e is also calculated at least in part based upon a weighted difference between the square of the instantaneous relative velocity $V_{inst}$ and the distance $\delta_{end}$. In accordance with another aspect of the invention, the error e is scaled by the instantaneous relative velocity $V_{inst}$ or a square of the instantaneous relative velocity $V_{inst}$.

The snubber control method in accordance with the present invention comprises the steps of:
(a) determining an instantaneous relative displacement ($\delta_{inst}$) based upon a sensor output from at least one sensor,
(b) setting a snubbing zone (Z) adjacent to an end stop limit,
(c) determining whether the instantaneous relative displacement ($\delta_{inst}$) is within the snubbing zone (Z),
(d) determining a snubber intrusion distance ($\delta_z$) which represents an distance of intrusion into the snubber zone (Z) from a point of first entry into the zone (Z),
(e) calculating a snubber control signal ($V_{snub}$) based at least in part upon a continuous function of the snubber intrusion distance ($\delta_z$),
(f) providing the snubber control signal ($V_{snub}$) to an output device, and
(g) continuously repeating steps (a) and (c) through (f).

According to another aspect of the snubber control method, the snubber control signal $V_{snub}$ is set to zero when not operating within the snubbing zone, Zu or Zl (FIG. 2). In a more detailed aspect, the continuous function is a linear or second order function of the snubber instrusion distance $\delta_z$. More preferably, the snubber control signal $V_{snub}$ is at least in part also calculated based upon the instantaneous relative velocity $V_{inst}$. Most preferably yet, the snubber control signal $V_{snub}$ is also calculated at least in part based upon a control gain setting $\sigma$.

In another aspect, the end stop control method in accordance with the present invention comprises the steps of:
(a) determining an instantaneous relative displacement ($\delta_{inst}$),
(b) determining an instantaneous relative velocity ($V_{inst}$),
(c) calculating an error value (e) based at least in part upon a square of the instantaneous relative velocity ($V_{inst}$),
(d) calculating an end stop value ($V_{end\ stop}$) based upon the error value (e), if the error value (e) is positive,
(e) setting a snubbing zone (Z) adjacent to an end stop limit,
(f) determining whether the instantaneous relative displacement ($\delta_{inst}$) is within the snubbing zone (Z),
(g) determining a snubber instrusion distance ($\delta_z$) which represents an distance of intrusion into the snubber zone (Z) from a point of first entry into the zone (Z),
(h) calculating a snubber control signal ($V_{snub}$) based at least in part upon a continuous function of the snubber instrusion distance ($\delta_z$),
(i) providing the snubber control signal ($V_{snub}$) and the end stop control signal ($V_{end\ stop}$) to an output device, and
(j) continuously repeating steps (a) through (d) and (f) through (i).

It is an advantage of one aspect of the present invention that end stop collisions can be avoided, even at relatively low velocities.

It is another advantage of the method in accordance with the present invention that the calculations required to implement end stop control may be accomplished with significantly less computational burden, thereby requiring less expensive microprocessors and less memory requirements.

The above-mentioned and further aspects, advantages and characteristics of the present invention will become apparent from the accompanying description of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

FIG. 5a illustrates a flow chart in accordance with the scaled velocity-squared end stop method of the present invention.

DETAILED DESCRIPTION OF THE PREFERRED EMBODIMENT

Figure 1:
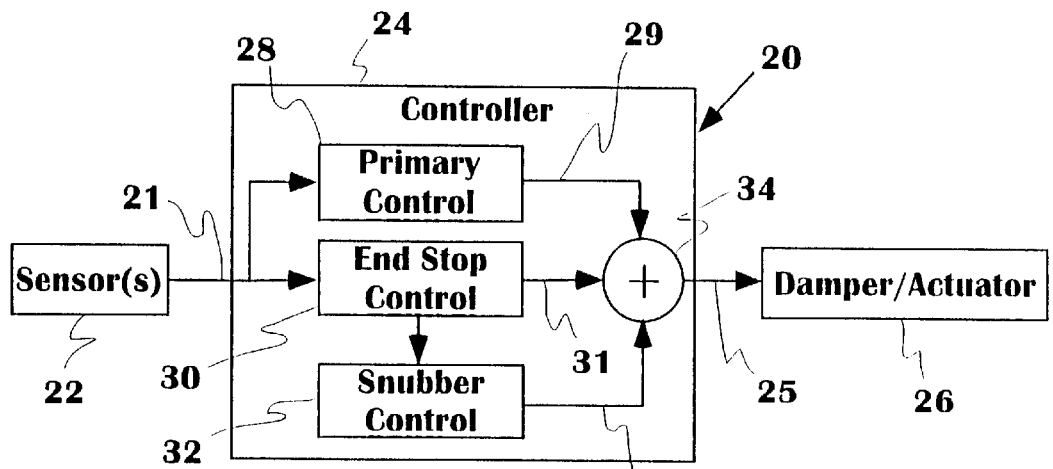
FIG. 1 illustrates a block diagram of the controllable system with which the methods in accordance with the present invention find utility.

Referring now to the drawings where like numerals denote like elements, in FIG. 1 is a block diagram illustrating the preferred implementation of the control methods in accordance with the present invention. The methods in accordance with the present invention operate within a controllable system 20 which includes an input signal in input line 21 from at least one input sensor 22. The sensor 22 is preferably a displacement sensor. Additionally, more than one sensor 22, such as a displacement, velocity or acceleration sensor, may be used to implement any aspect of the overall control. For example, some primary control methods require inputs from more than one sensor. An electronic controller 24 including an appropriate microprocessor and/or memory implement the overall control in accordance with the present invention. The controller 24 outputs an overall control signal ($V_{overall}$) to the output device 26 in output line 25. Of course lines 21, 25 would be implemented as electrical cables which interconnect to the controller 24 in practice. Input and output processing details, such as the amplifier and filters are not shown for clarity.

In a preferred implementation, within the controller 24, several control methods are simultaneously executed. A primary control method, as illustrated by block 28, operates to provide the appropriate primary control signal ($V_{primary}$) in primary output line 29 for the control of, for example, ride of a primary suspension in a motor vehicle or ride in a vehicle seat suspension. The primary control receives an output(s) from the sensor(s) 22. Any of the afore-mentioned known primary control methods or any other suitable primary control method may be implemented. Generally, the primary control method attempts to minimize vibration. The prior art "Rate Control" method mentioned above is one method which is simple to implement and which is very effective.

Preferably operating in tandem with the primary method 28, and in accordance with a first aspect of the present invention, is a novel end stop method 30 (hereinafter referred to as the velocity-squared end stop method). This velocity-squared end stop method 30 provides an end stop control signal ($V_{end\ stop}$) in end stop output line 31 when it is determined by the end stop control method 30 that an end stop collision is imminent. The two control signals from output lines 29 and 31 are added at adder 34 and provided to the output device 26. Notably, there also may be a contribution from the snubber control method as will become readily apparent. The output device 26 may be a controllable or semi-active damper, such as an magnetorheological fluid damper, an electrorheological fluid damper, an orifice setting damper, or any other suitable damper capable of providing variable damping characteristics. Alternatively, any actuator device capable of providing controllable forces, such as an electro-magnetic actuator, hydraulic actuator, pneumatic actuator, or variable spring device may be used as the output device 26.

In accordance with another aspect of the present invention in block 32 is provided another end stop control method, hereinafter referred to as "Snubber Control". The snubber control method 32 preferably operates in conjunction with an end stop control method, such as the velocity-squared end stop method 30 to oversee that method and prevent end stop collisions under the small number of conditions where, even though the end stop control method 30 is operative, an end stop collision is still likely to occur. It will become readily apparent, that these small number of cases usually occur when the relative velocity is relatively low. It should also be understood that, although each aspect of the present invention are preferably meant to operate together, that each, i.e., the velocity-squared end stop method 30 and the snubber control of block 32 may be used individually, in combination with each other or in combination with a primary control method 28. In a most preferred embodiment, the overall control is provided by implementing the velocity-squared end stop method 30 in combination with the snubber control method 32 and in further combination with a primary control method 28. Most preferably, it is found by the inventors that the velocity-squared end stop method 30 and the snubber control method 32 are implemented with a primary control method 28 such as the so-called "Rate Control Method taught in U.S. Pat. No. 5,652,704 to Catanzarite. How these methods are used together will be thoroughly described with reference to FIG. 8.

Figure 2:
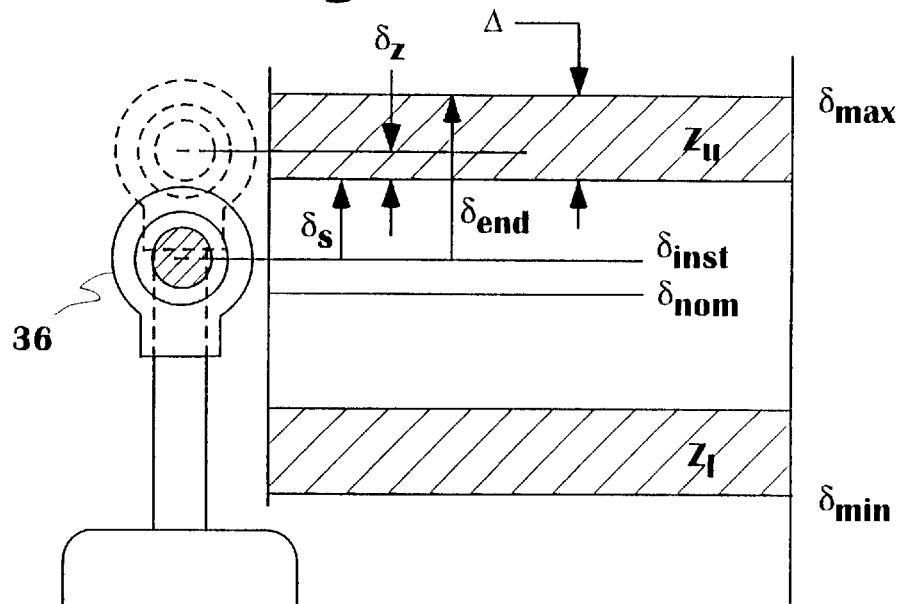
FIG. 2 illustrates a frontal view of the controllable output device (damper/actuator) illustrating the various positional parameters associated with the control methods of the present invention.

Now referring to FIG. 2, the various positional, end stop and snubber parameters of the output device 26 will be described in more detail. The output device 26 is adapted to attach at its ends 35, 36 between two relatively moving components (now shown), such as between any two relatively movable structural members. For example, the device 26 may be attached between the suspension component and a frame of a motor vehicle. Similarly, the device 26 may be attached in a controllable seat suspension system between the seat and any part of the seat suspension (ex. frame, bracketry, linkages, etc.). Notably, the velocity-squared end stop method 30 and the snubber control method 32 in accordance with the present invention are preferably implemented in systems where end stop collisions are likely to occur.

The output device 26 is capable of excursions between a maximum and minimum stroke limits. The maximum and minimum stroke limits will be referred to herein as end stop limits $\delta_{max}$ and $\delta_{min}$. Generally, these limits $\delta_{max}$ and $\delta_{min}$ are determined by mechanical stops within the system, such as rubber bumpers, etc., but could also be artificially set within the control method. The sensor 22 (FIG. 1), which is most preferably a deflection sensor, provides displacement information regarding the instantaneous relative position $\delta_{inst}$ between the relatively moving components (not shown). This instantaneous relative position $\delta_{inst}$ value is used as an input to both the velocity-squared end stop method 30 and the primary control method 28. The inputs to the snubber control method 32 are preferably received as values already used or determined by the end stop control method 30, thereby minimizing processing. Of course, the input values could be fed directly from sensor(s) 22 to the snubber control method 32, but at the cost of additional processing of the information common to the end stop method 30 and the snubber method 32. Generally, the device 26 is designed to operate about some nominal displacement $\delta_{nom}$; having some available stroke on either side thereof in which to accomplish control. In the seat suspension system, for example, the nominal displacement $\delta_{nom}$ is set by the driver via a manually operated leveling switch.

The velocity-squared end stop method 30 utilizes a closest distance $\delta_{end}$ to the end stop limits, $\delta_{max}$ or $\delta_{min}$, in conjunction with relative velocity $V_{inst}$ to derive an error e which is then utilized to derive an end stop output signal $V_{end\ stop}$. The end stop distance $\delta_{end}$ value is determined based upon the end stop limit values $\delta_{max}$ or $\delta_{min}$ and the instantaneous relative position $\delta_{inst}$ as will be explained later herein. The end stop limit values $\delta_{max}$ or $\delta_{min}$ are preferably obtained during an initial calibration procedure. Similarly, the instantaneous relative position $\delta_{inst}$ is derived directly from the sensor 22. The relative velocity $V_{inst}$ is derived based upon the instantaneous relative position $\delta_{inst}$ by differentiating or filtering, as are well understood by those of ordinary skill in the art.

As will be described later, the snubber control method 32 utilizes snubber zones Zu, Zl. When the instantaneous relative position $\delta_{inst}$ is operating within one of the zones, Zu or Zl, a snubber control signal $V_{snub}$ is provided. The snubber control signal $V_{snub}$ is derived based upon a continuous function of the incursion distance $\delta_z$ into the respective zone, Zu or Zl. The incursion distance $\delta_z$ is the distance from the point of first entry into the zone, Zu or Zl, to the position where the time sample in question is taken. The width of the zone, Zu or Zl, is set based upon a predetermined parameter $\Delta$. This parameter $\Delta$ is determined based upon a percentage P of the total displacement range DR. Displacement range DR is determined from $\delta_{max}$ and $\delta_{min}$.

Each of the control methods in accordance with the present invention will now be described in detail. First, the velocity-squared end stop method 30 will be described. As previously mentioned, the overall control signal $V_{overall}$ to a damper type device 26 is typically given by $$V_{overall} = V_{primary} + V_{end\ stop}$$

and for an actuator device, the overall control signal $V_{overall}$ can be formulated as $$V_{overall} = V_{primary}\left(1 - \left|\frac{V_{end\ stop}}{V_{max}}\right|\right) + V_{end\ stop}$$

The term multiplying the primary control signal $V_{primary}$ acts to linearly scale back the effect of the primary control signal when the end stop signal $V_{end\ stop}$ approaches its maximum level. There are a variety of alternative strategies which perform a similar function and they are all considered within the scope of this invention. For simplicity, the remainder of this description will focus on the damper implementation. The output of the control methodology may be easily converted for use with an actuator system by utilizing the relation outlined above.

The velocity-squared end stop control method gets around the requirement for a square-root function of the prior art Miller '622 end stop method without sacrificing functional performance. Therefore, the present invention is more efficient. In its simplest form, the velocity-squared end stop algorithm comprises the steps of:

Step 1: Determine the (positive) distance to the closest end-stop limit ($\delta_{max}$ or $\delta_{min}$) based on the direction of motion $\delta_{end} = \delta_{max} - \delta_{inst}$ when $V_{inst} > 0$ $\delta_{end} = \delta_{inst} - \delta_{min}$ when $V_{inst} < 0$ Step 2: Determine an "error" value (e) which is, at least in part, a function of $V_{inst}^2$ $$e = \alpha V_{inst}^2 - \delta_{end}$$

where:

α=a tuning constant gain, $V_{inst}$=the instantaneous relative velocity, and $\delta_{end}$=the distance to the approaching end stop limit.

As can be seen, the error e is also, at least in part, a function of $\delta_{end}$. Moreover, the error e is preferably also, at least in part, a function of α. Where α represents a relative weighting between the terms $V_{inst}^2$ and $\delta_{end}$.

Step 3: Determine the end-stop command signal $V_{end\ stop}$ which is preferably added to the primary control signal $V_{primary}$ $$V_{end\ stop} = \beta e \quad \text{when } e > 0$$

$$V_{end\ stop} = 0 \quad \text{when } e \leq 0$$

where

β=a tuning constant gain

The main difference between the velocity-squared end stop method 30 and the prior art Miller '622 end-stop method is the way in which the error e is quantified. The inventor herein recognized that by specifying the error e in terms of the distance from the operating point to the e=0 line measured perpendicular to the $V_{inst}$ axis then computational burden is significantly decreased. The prior art measured the error e parallel to the $V_{inst}$ axis. To help illustrate this difference, reference is now made to FIG. 4c, which illustrates the first quadrant portion of FIG. 4b in the plane of the paper (the $\delta_{inst}$ and $V_{inst}$ plane). In FIG. 4c is shown the e=0 line 44. In the present invention, the error (designated e2) is measured as the distance from the operating point 46 to the e=0 line 44 measured in a direction perpendicular from the $V_{inst}$ axis. By way of comparison, in the prior art Miller '622 method, the error e1 is determined based upon measuring the distance from the operating point 46 to the e=0 axis 44 measured in a direction perpendicular from the $\delta_{inst}$ axis. In this quadrant, the velocity squared error e2 is given by $$e2 = \alpha V_{inst}^2 - (\delta_{max} - \delta_{inst})$$

and the prior art Miller '622 error e1 is given by $$e1 = \text{Abs}(\alpha V_{inst}) - \text{sqrt}(\delta_{max} - \delta_{inst})$$

In terms of the number of instructional counts to calculate each function e1 and e2, it should be recognized that the e1 calculation requires at least 10 times the instructional counts to evaluate as compared to the e2 calculation of the present invention. Notably, it is extremely important that the calculation time for each sample update be minimized.

Figure 3A:
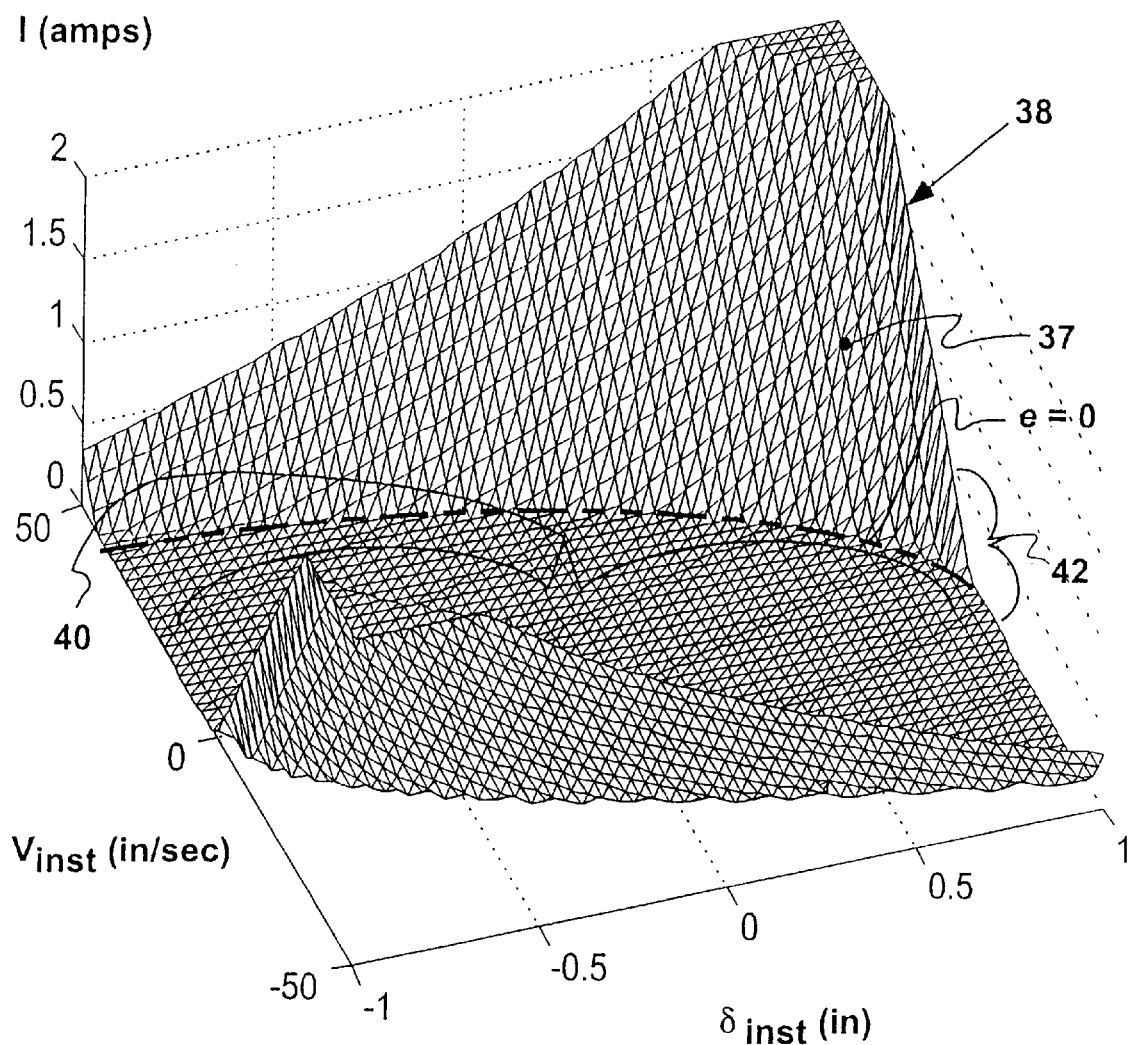
FIG. 3a illustrates a graphical depiction of a control surface of the preferred implementation of the prior art end stop control method described in the Miller '622 patent.

In comparing the differences between the prior art Miller '622 method (FIG. 3a) and the velocity-squared method (FIG. 4b), it is revealed that the control surfaces are only slightly different. However, the velocity-squared end stop method is much more computationally efficient than the error calculation in prior art Miller '622 end stop method.

Figure 4A:
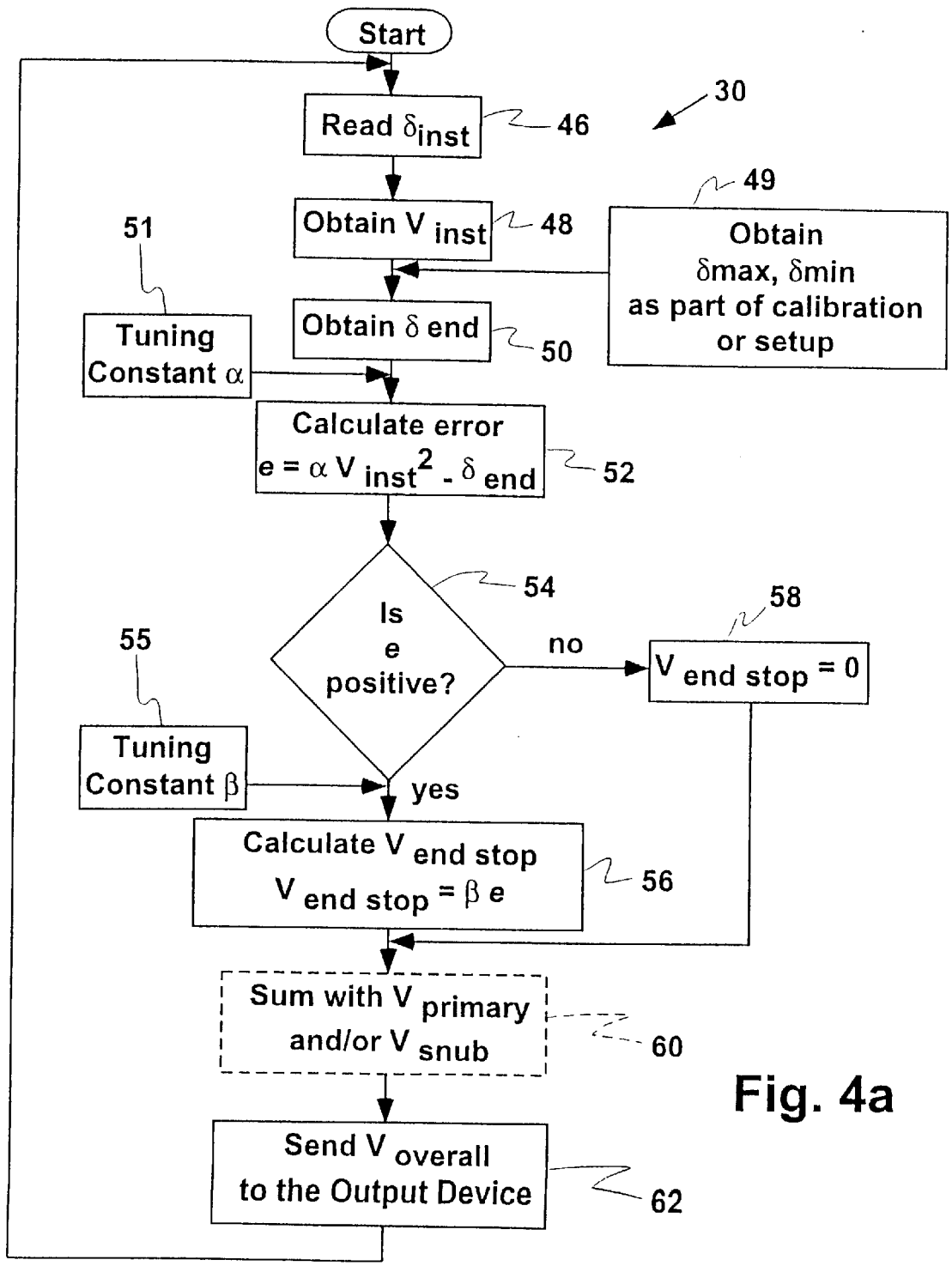
FIG. 4a illustrates a flow chart in accordance with the velocity-squared end stop method of the present invention.

Referring now to FIG. 4a is shown a flow chart outlining the method steps in the velocity-squared end stop control method 30. The method first comprises the steps of reading the instantaneous displacement $\delta_{inst}$ in step 46 and then obtaining the instantaneous velocity $V_{inst}$ via direct measurement from a relative velocity sensor, such as taught in 4,949,573 to Wolfe et al., entitle "Velocity Transducer For Vehicle Suspension System" or through a filtering or differentiation operation in step 48. Then the displacement to the end $\delta_{end}$ is calculated in step 50 using the limit values $\delta_{max}$ or $\delta_{min}$ dependent upon whether the instantaneous velocity is positive or negative. The values $\delta_{max}$ and $\delta_{min}$ in block 49 are preferably determined during a calibration routine and stored in memory. Alternatively, the values may be arbitrarily set at, for example +/– some finite value, such as +/–1.00 inch.

In step 52, the error value e is calculated by the controller's microprocessor or Digital Signal Processor (DSP). The error e is based upon the square of the instantaneous velocity $V_{inst}$ obtained in step 48, $\delta_{end}$ obtained in step 50 and α, a tuning constant from block 51, which is chosen by trial and error to achieve the appropriate end stop control for the conditions expected. The value of and α is stored in memory, set on a Dual In-Line Package (DIP) switch, or otherwise made available to the microprocessor or DSP. In decision step 54, the question is asked: Is e positive? If yes, then the method 30 goes on to calculate the end stop control signal $V_{end\ stop}$ in block 56. The end stop control signal $V_{end\ stop}$ is based upon β, a tuning constant of block 55 which is obtained and stored in a similar fashion as a of block 51. If the answer is no, the value of $V_{end\ stop}$ is set to zero in block 58.

Optionally, yet preferably, the end stop control signal $V_{end\ stop}$ in block 56 is summed with the primary control signal $V_{primary}$ and the snubber control signal $V_{snub}$ of block 60. The snubber control signal $V_{snub}$ is obtained in accordance with the snubber control method and with reference to FIG. 6a herein. The primary control signal $V_{primary}$ is preferably obtained from the "Rate Method" described in U.S. Pat. No. 5,652,704. As was mentioned before, the summing step of block 60 is optional, as the method 30 may be used by itself. For example, the method 30 might be used where there is a suspension system including a soft spring which provides good isolation and where the controllable damper where the damping rate is changed only when transient conditions are encountered, i.e., slow acting adaptive-type control. In such systems, end stop control methods can prevent collisions.

Figure 4B:
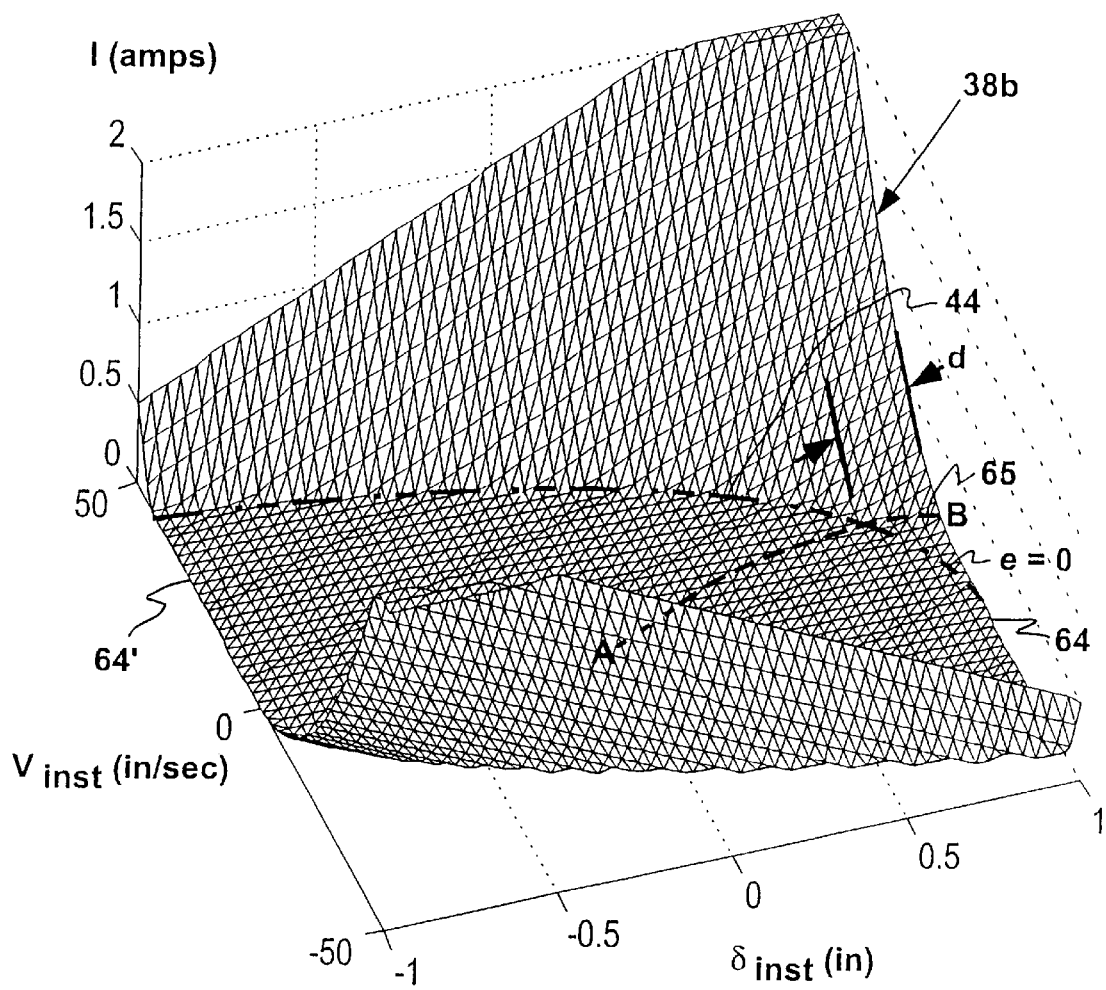
FIG. 4b illustrates a graphical depiction of a control surface in accordance with the velocity-squared end stop method of the present invention.
Figure 4C:
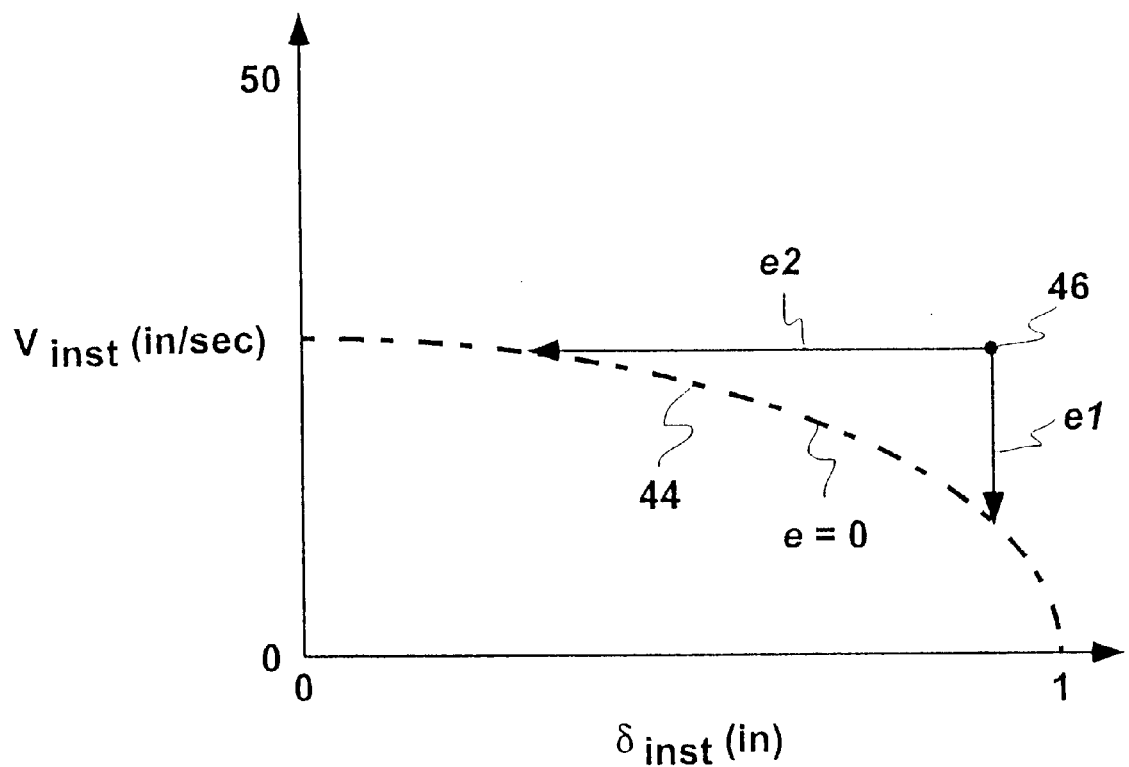
FIG. 4c illustrates a graphical depiction of the error calculation in accordance with the velocity-squared end stop method of the present invention.

As shown in FIG. 4b illustrating the control surface 38b for the the velocity-squared method, if the instantaneous velocity $V_{inst}$ and distance $\delta_{inst}$ are such that a current I is commanded, then the additional damping retards further motion and slows the advance to the end stop limits 64, 64'. It should be noted that although the e=0 line 44 intersects at $V_{inst}$=0, it is still possible to have an end stop collision because the reaction stroke is too short for low velocity, high stroke excursions. An example of a low-velocity, high-stroke excursion is given by line 65. When a driver exits from a controllable vehicle seat suspension including an air spring, the seat wants to rise up from point A on line 65 and go towards point B, whilst picking up some velocity. However, it should be recognized that no end stop signal is derived until the e=0 line 44. At this point, there in only a reaction distance d of 0.125 inch and the angle into the surface 38b which corresponds to increased current to the damper is so shallow that only minimal current is commanded (Ex. about 0.25 amps—about only ⅛ of that available). In some cases, this distance d and the associated commanded I value is insufficient to stop an impending collision with the upper end stop limit 64. Moreover, this is so even though the end stop method 30 is operating as intended. This is the problem solved by the snubber control method described with reference to FIG. 6a herein.

Figure 5B:
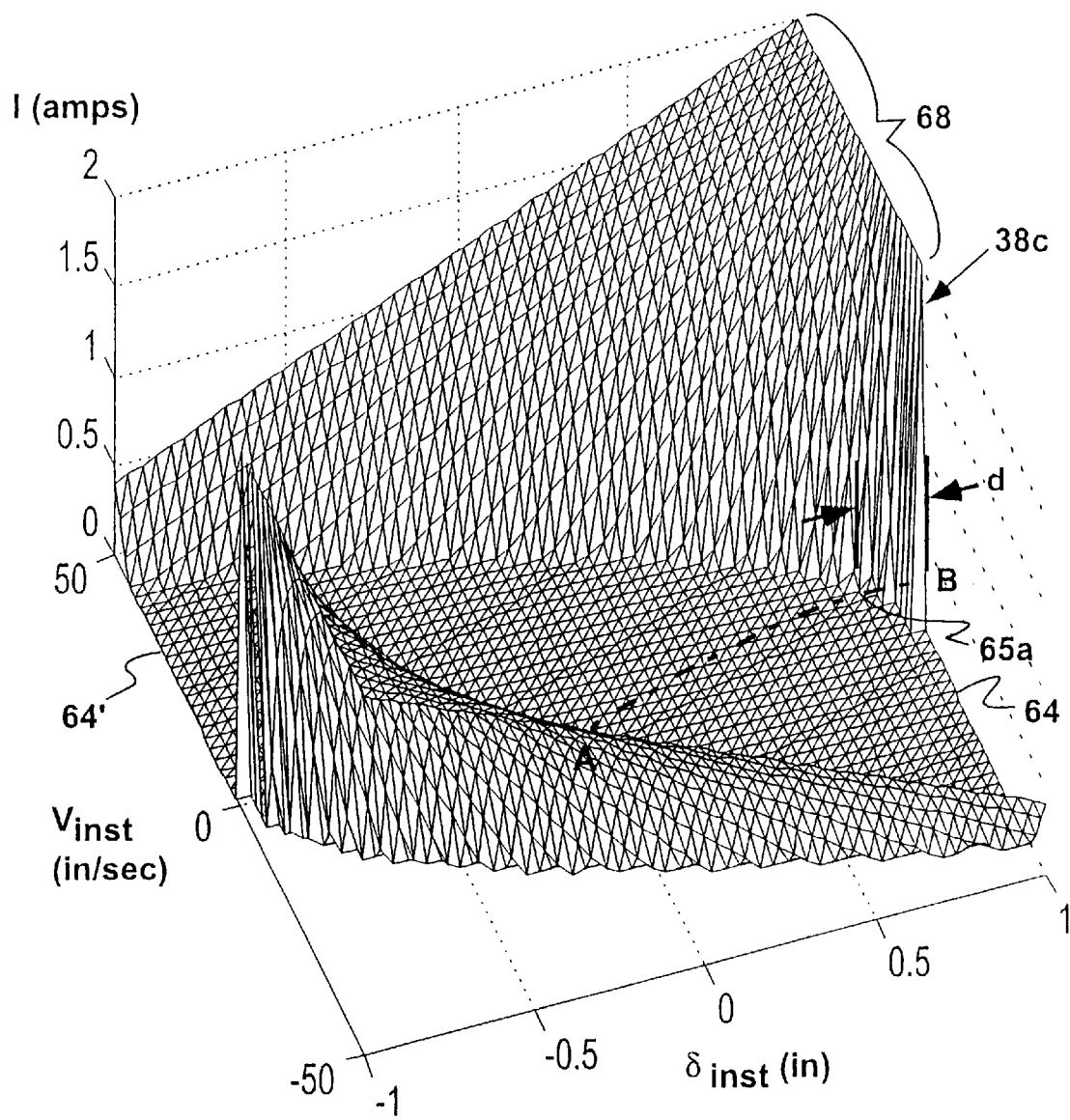
FIG. 5b illustrates a graphical depiction of a control surface in accordance with the scaled velocity-squared end stop method of the present invention.

The scaled velocity-squared end-stop method 30a described with reference to FIGS. 5a and 5b is a variation to the velocity-squared end-stop method 30 (FIG. 4a and 4b) which results in only slightly more computational burden, yet improved end stop control. Notably, the velocity-squared end-stop method 30a results in a control surface 38c that is very similar to the preferred implementation of the prior art Miller '622 end stop method. In its simplest form, the scaled velocity-squared method 30a comprises the following steps:

Step 1: Determine the (positive) distance to the appropriate end-stop limit based on the direction of motion $$\delta_{end} = \delta_{max} - \delta_{inst} \text{ when } V_{inst} > 0$$

$$\delta_{end} = \delta_{inst} - \delta_{min} \text{ when } V_{inst} < 0$$

Step 2: Determine an "error" value (e)

$$e = \alpha V_{inst}^2 - \delta_{end}$$

where:

$\alpha$ = a tuning constant, $V_{inst}$ = the instantaneous relative velocity, $\delta_{end}$ = the distance to the approaching end stop limit Step 3: Scale the error value with one of the two scaling options $$e_{scaled} = e(\alpha V_{inst}^2)^{-1} \quad \text{more conservative}$$

$$e_{scaled} = e(\alpha \text{abs}(V_{inst}))^{-1} \quad \text{less conservative}$$

Step 4: Determine the end-stop control signal $V_{end\,stop}$ which is preferably added to the primary control signal $V_{primary}$ and/or the snubber control signal $V_{snub}$ and provided to the output device $$V_{end\,stop} = \beta e_{scaled}^n \quad \text{when } e > 0$$

$$V_{end\,stop} = 0 \quad \text{when } e_{scaled} \leq 0$$

where typically n=1 or n=2. It should be recognized that the afore-mentioned velocity-squared end stop method 30 could also have the error e raised to a power function of n. As indicated in FIG. 5b by number 68 on control surface 38c, when the "more conservative" scaling option is selected, this scaled velocity-squared method 30a produces a maximum end stop control signal $V_{end\,stop}$ whenever $\delta_{end}$=0, independent of the magnitude of the velocity $V_{inst}$.

In FIG. 5a, the steps of blocks 46, 48, 50 and 52 are the same as in the velocity-squared method 30. However, in step 67 of the scaled method 30a, the error e is scaled to derive $e_{scaled}$. Moreover, in steps 54, the sign decisions are made based upon $e_{scaled}$ rather than e. Likewise, in block 56, the end stop calculation is based upon $e^n$. As best seen in FIG. 5b, this scaling adds a maximum end current I whenever $\delta_{end}$=0, i.e., at the end stops as indicated by number 68. The remainder of the steps 60 and 62 are the same as in the velocity-squared method 30. This method 30a ramps the current I up very quickly to the maximum value when approaching the end stop limits 64, 64'. Of course, it still suffers from the problem that the reaction distance d for a low-velocity, high displacement excursion (see line 65a) is still quite small, although larger that the velocity-squared method 30. Therefore, it is desirable to use the scaled velocity-squared method 30a with the snubber control method 32 of FIG. 6a and 6b also.

Figure 6A:
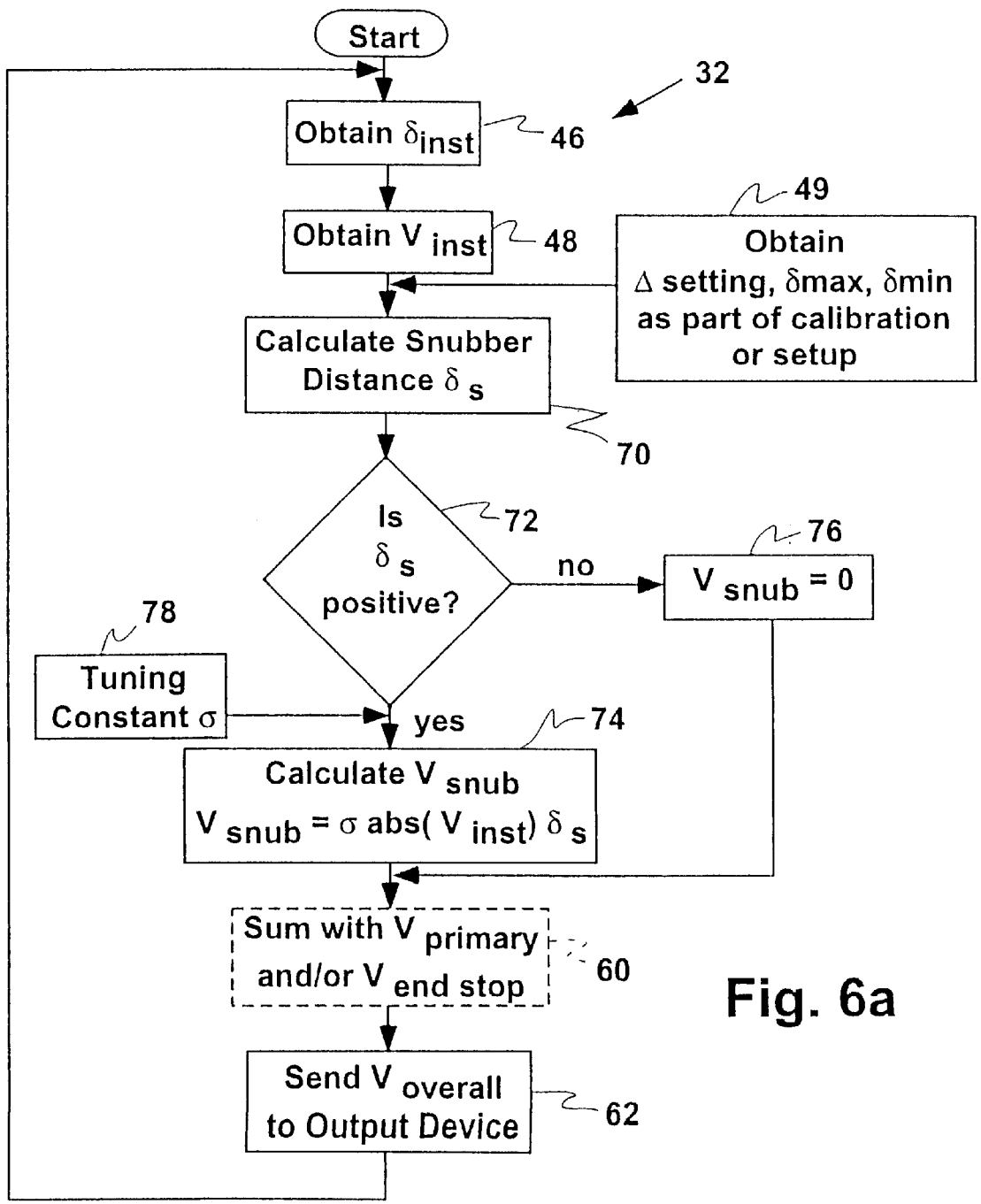
FIG. 6a illustrates a flow chart in accordance with the snubber control method of the present invention.

Now with reference to FIGS. 2, 6a and 6b, the snubber control method 32 will be described in detail. The snubber control method 32 provides a means for controlling an output device 26, such as a controllable damper or brake, in such a way that the action of a snubber is created without a mechanical snubber being present. The snubber control method 32 helps to reduce the frequency and severity of end-stop hits by applying a snubber control signal $V_{snub}$ near the system's end stop limits 64, 64'. Notably, the snubber control method 32 has an additional advantage over an elastomeric or spring snubber in that there isn't any energy storage mechanism (spring means) that would normally cause a rebound after the system motion is arrested.

The snubber control method 32 computes an output signal based on two input signals at a 200 Hz rate. The first input is the instantaneous displacement $\delta_{inst}$ in step 46. The second input is the instantaneous relative velocity $V_{inst}$ of step 48 and as defined above. These values $\delta_{inst}$ and $V_{inst}$ are generally provided from the end stop method 30, etc. Based upon the values in block 49, i.e., $\delta_{max}$ and $\delta_{min}$ and a user defined input P (percentage) the thickness $\Delta$ of the zones, Zu and Zl, are preferably determined by the relation $$\Delta = (P/100) \text{Abs}(\delta_{max} - \delta_{min})$$

$\Delta$ is a pre-computed positive constant which defines the thickness of the snubber zones, Zu and Zl, as a percentage P of the total displacement range (DR), where $$DR = \text{abs}(\delta_{max} - \delta_{min})$$

Typically, the snubber zones, Zu and Zl, will be set at between P=10–30% of the total displacement range (DR) thereby providing zones Zu and Zl near each end stop limit $\delta_{max}$ and $\delta_{min}$. The percentage P may be provided in any manner, such as by setting an internal DIP switch, downloading information or retrieving a value stored in memory. Likewise, the values of $\Delta$ may be direct inputs. For example, +/−0.25 inch.

Based upon the instantaneous displacement $\delta_{inst}$ and the thickness $\Delta$, the snubber distance $\delta_s$, i.e., the distance from the approaching snubber is calculated in step 70. The snubber distance $\delta_s$ is given by $$\delta_s = \Delta - \delta_{end}$$

The snubber distance $\delta_s$, when positive, is a measure of the instrusion distance $\delta_z$ into the zone Zu or Zl.

In step 72, the question becomes is the snubber distance $\delta_s$ positive? If the answer is yes, the snubber control signal $V_{snub}$ is calculated in step 74. If the answer is no, the snubber control signal $V_{snub}$ is set to equal zero in step 76. In either case, the snubber control signal $V_{snub}$ is given by $$V_{snub} = \begin{cases} \sigma |V_{inst}| \delta_s^2 & \delta_s > 0 \\ 0 & \delta_s \leq 0 \end{cases}$$

$\sigma$ is a control gain of block 78 which is greater than zero and which must be tuned per application requirements. Preferably, yet optionally, the snubber control signal $V_{snub}$ is directly added to the end stop control signal $V_{end\,stop}$ and the primary control signal $V_{primary}$ in block 60 to generate the overall control signal $V_{overall}$ which is provided to the output device in step 62.

Figure 6B:
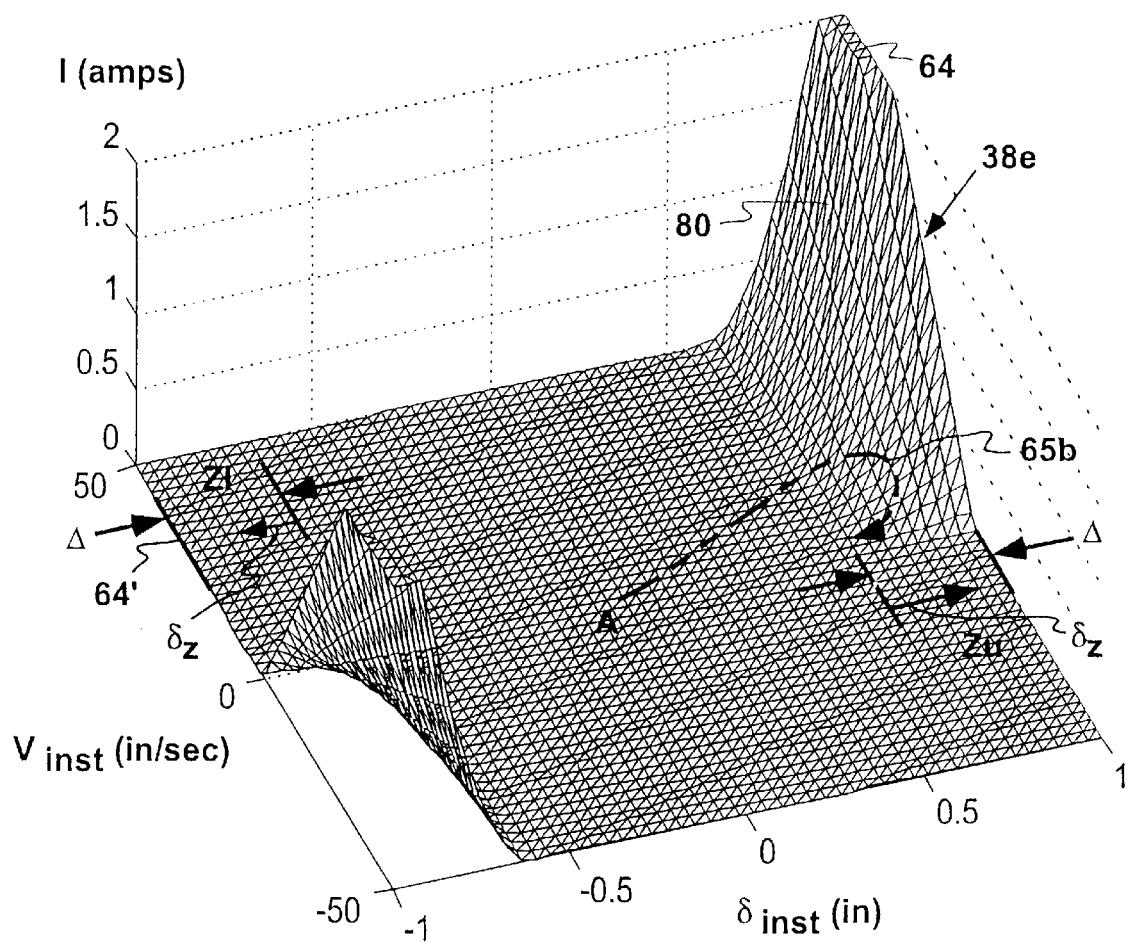
FIG. 6b illustrates a graphical depiction of a control surface in accordance with the snubber control method of the present invention.

As can be seen in FIG. 6b, it can be readily seen that the ramp up in current I on the control surface 38e is a continuous function of the incursion distance. Most preferably, the ramp up in current I is, at least in part, a square function of the incursion distance $\delta_z$. As can also be seen, the current I to the output device is also a function of the velocity $V_{inst}$. As shown, the ramp up is shown as a second order function of incursion distance $\delta_z$ and as a linear function of velocity $V_{inst}$. The snubber control method 32 minimizes end stop collisions under low-velocity, large displacement conditions, such as previously mentioned. For example, as a transient condition due to a low-velocity, large displacement situation is encountered, such as illustrated by line 65b, the continuous function which defines the snubber surface 80 slows the velocity and successfully avoids an end stop collision, as indicated by the turnaround in line 65b.

Figure 7:
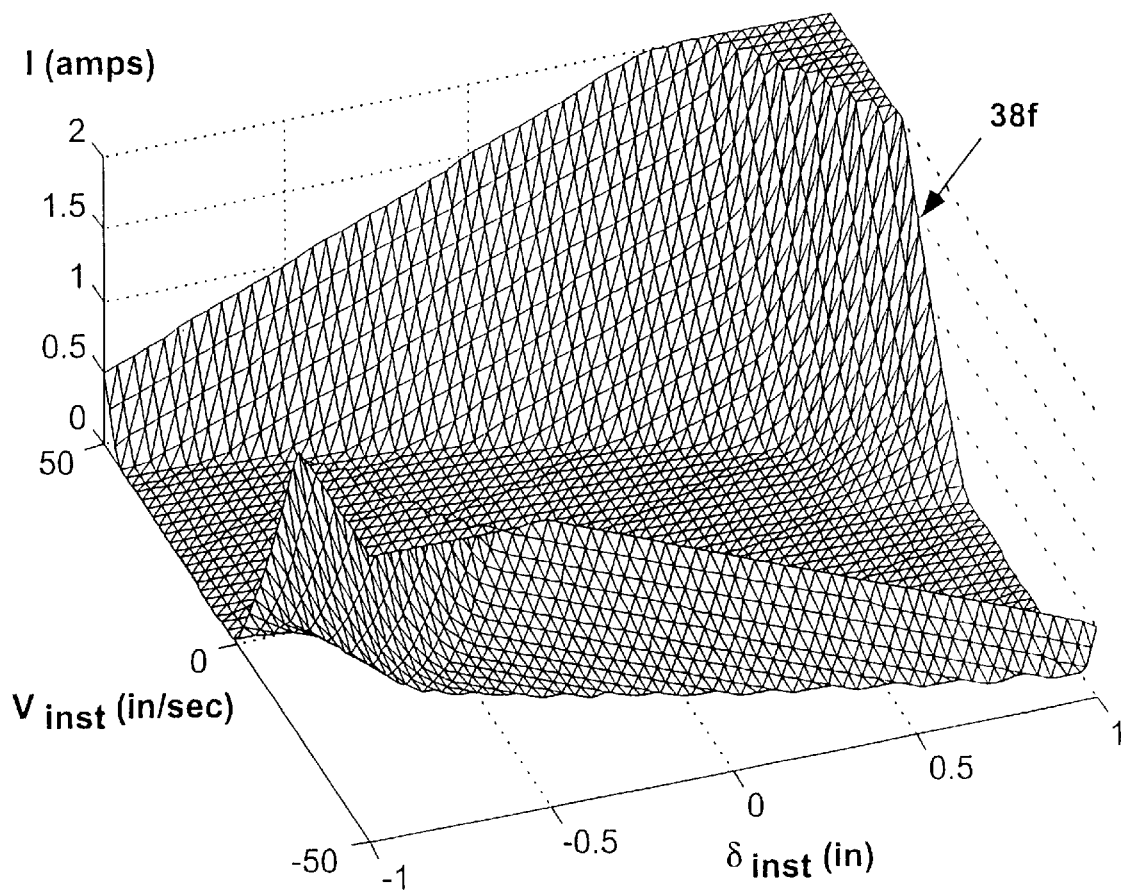
FIG. 7 illustrates a graphical depiction of a control surface of the velocity-squared end stop method combined with the snubber control method of the present invention.

FIG. 7 illustrates the control surface 38 illustrating the velocity-squared end stop method 30 of FIG. 4b combined with the snubber control method 32 of FIG. 6b. As can be seen, the combined method has the advantage of efficiently reducing end stop collisions in cases where the input transient is either high-velocity and high-displacement or low-velocity and high-displacement.

Figure 3B:
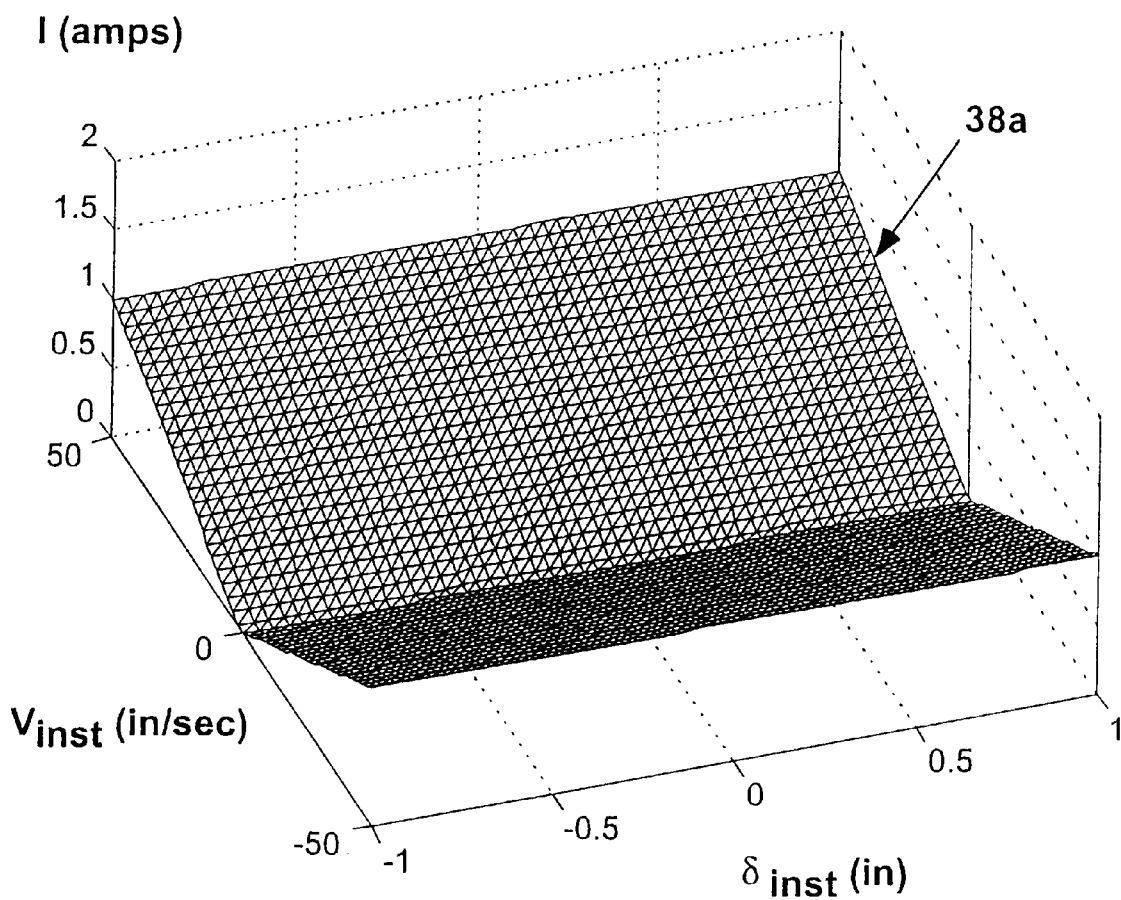
FIG. 3b illustrates a graphical depiction of a control surface of a prior art "Rate Control" method.
Figure 8:
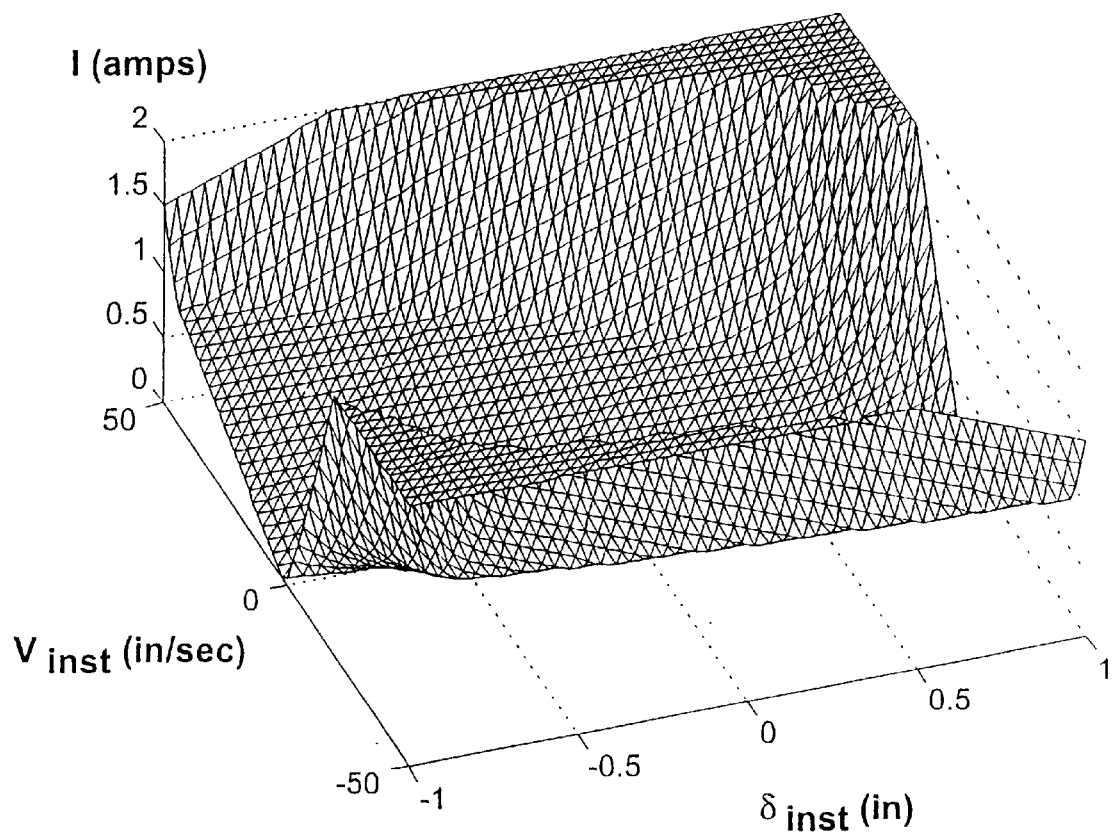
FIG. 8 illustrates a graphical depiction of a control surface of the velocity-squared end stop method and snubber control method of the present invention in combination with the prior art "Rate Control" method.

FIG. 8 illustrates the method in accordance with the present invention where the velocity-squared end stop method 30 of FIG. 4b is combined with the snubber control method 32 of FIG. 6b and in further combination with the prior art "Rate Control" method of FIG. 3b. This combination of methods is found to be particularly effective in the seat suspension application.

Figure 9:
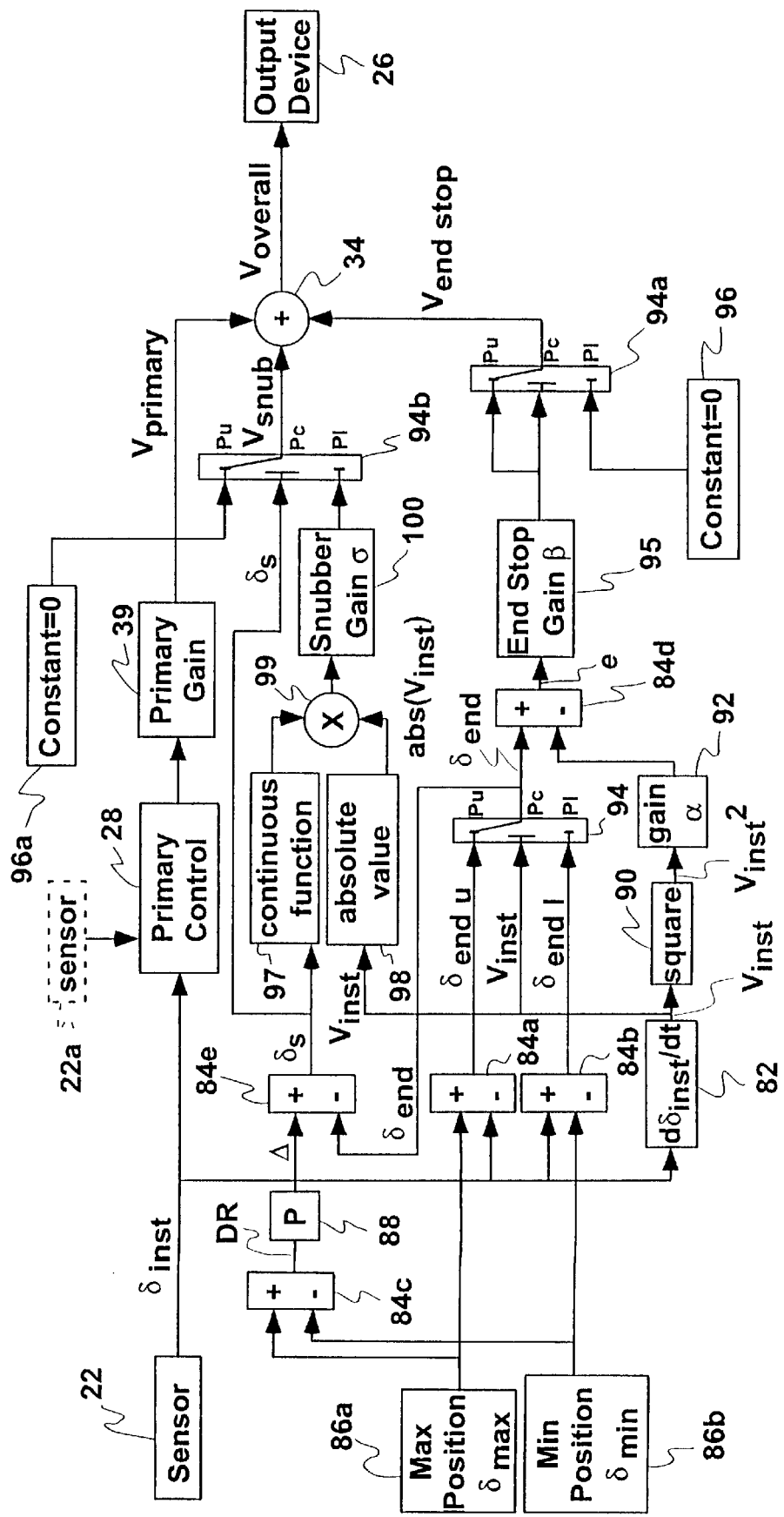
FIG. 9 illustrates a block diagram illustrating the overall control method in accordance with the present invention.

FIG. 9 illustrates a block diagram in accordance with the present invention producing an overall signal $V_{overall}$ to the output device 26 which includes contributions from the primary control method $V_{primary}$, contributions from the end stop control method $V_{end\ stop}$ and contributions from the snubber control method $V_{snub}$ all summed at adder 34. Optional sensor 22 provides the instantaneous position $\delta_{inst}$ to primary control 28, to differentiator 82 and to subtractors 84a. $\delta_{max}$ and $\delta_{min}$ stored in memory blocks 86a, 86b are provided to subtractors 84a, 84b and 84c. Subtracting $\delta_{max}$ and $\delta_{min}$ provides the displacement range DR. This is then passed through percentage block 88 where the zone thickness $\Delta$ is calculated. The output of subtractors 84a and 84b are the distance to the upper end stop limit $\delta_{end\ u}$ and the distance to the lower end stop limit $\delta_{end\ l}$, respectively. The switch 94 receives $\delta_{end\ u}$ at its upper pole Pu, $\delta_{end\ l}$ at the lower pole Pl and $V_{inst}$ at its center pole Pc. If $V_{inst}$ is positive, then the switch 94 is set to the upper pole Pu and $\delta_{end}$ then equals $\delta_{end\ u}$. If $V_{inst}$ is negative, then the switch 94 is set to the lower pole Pl and $\delta_{end}$ then equals $\delta_{end\ l}$.

The instantaneous position $\delta_{inst}$ is then passed through differentiator 82 to provide instantaneous velocity $V_{inst}$. Output from squarer 90 produces $V_{inst}^2$. $V_{inst}^2$ is then multiplied by the gain $\alpha$ in block 92. The value $\alpha V_{inst}^2$ is then subtracted from $\delta_{end}$ to provide the error e. The error e is then multiplied by the end stop gain $\beta$ in block 95 to derive an output value to the switch 94a. Switch 94a is triggered to either the upper pole Pu or the lower pole Pl depending on the sign of the output value at the center pole Pc. As mentioned above, if the output value to center pole Pc is positive, then $V_{end\ stop}$ is set equal to the output value via setting switch to the upper pole Pu. If the output value to center pole Pc is negative, then $V_{end\ stop}$ is set equal to zero via setting switch to the lower pole Pl which extracts the constant stored in block 96. The output from switch 94a, of course is the value of $V_{end\ stop}$, which is generally a digital value which is preferably summed at junction 34 with the other control signals.

Now referring to subtractor 84e in FIG. 9, which subtracts the value of $\delta_{end}$ from the value of $\Delta$ to produce the snubber distance $\delta_s$. The snubber distance $\delta_s$ is then input to a continuous function block 97 to derive an output which can be a linear function of the snubber distance $\delta_s$, or more preferably, a square (second order) function of the snubber distance $\delta_s$. The instantaneous velocity value $V_{inst}$ is passed through absolute value operator 98 to derive the absolute value of $V_{inst}$. The output of operator blocks 97 and 98 are then multiplied at multiplier 99 and multiplied again by gain s in block 100. The output from block 100 is provided to switch 94b at its lower pole Pl. A constant=zero obtained from block 96a is provided at the upper pole Pu. The snubber distance $\delta_s$ is provided at the center pole Pc. If the snubber distance $\delta_s$ is positive, the switch is set to the lower pole Pl. If the snubber distance $\delta_s$ is negative, the switch 94b is set to the upper pole Pu. The value of $V_{snub}$ which is output from the switch 94b is provided to the adder 34. The primary control 28 and gain 39 are illustrated as simple blocks. Of course, it should be recognized that this is a simplification, that the primary control method may have numerous steps and may have other inputs from optional sensors 22a. Any of the known primary control methods may be implemented in combination with the velocity squared or snubber control methods in accordance with the present invention.

In summary, it should be apparent from the foregoing that the present invention comprises a novel velocity-squared end stop control method and a novel snubber control method; the two methods preferably operating together to provide an end stop method which improves upon the prior art end stop methods by being more computationally efficient as well as reducing the incidents of end stop collisions, especially at lower velocities.

While several embodiments, including the preferred embodiment of the present invention have been described in detail, various modifications, alterations, changes and adaptations to the aforementioned may be made without departing from the scope of the present invention defined in the appended claims. It is intended that all such modifications, alterations and changes be considered part of the present invention.

What is claimed is:

1. An end stop control method, comprising the steps of:
   (a) determining an instantaneous relative velocity ($V_{inst}$) based upon a sensor output from at least one senor,
   (b) calculating an error value (e) based at least in part upon a squared of said instantaneous relative velocity ($V_{inst}$),
   (c) calculating an end stop control signal ($V_{end\ stop}$) based upon said error value (e), if said error value (e) is positive,
   (d) providing said end stop control signal ($V_{end\ stop}$) to an output device, and
   (e) repeating steps (a) through (d).

2. A method of claim 1 comprising an additional step of setting said end stop control signal ($V_{end\ stop}$) equal to zero if said error value (e) is negative.

3. A method of claim 1 comprising an additional step of obtaining a end stop distance ($\delta_{end}$) to an end stop limit based upon said sensor output, said error value (e) being at least in part calculated from said end stop distance ($\delta_{end}$).

4. A method of claim 3 wherein said error value (e) is calculated at least in part based upon a weighted difference between said square of said relative velocity and said distance ($\delta_{end}$).

5. A method of claim 1 wherein said end stop control signal ($V_{end\ stop}$) is combined with a primary control signal ($V_{primary}$) derived from a primary control method to derive an overall control signal ($V_{overall}$).

6. A method of claim 1 wherein a end stop distance ($\delta_{end}$) to an end stop limit is derived by obtaining maximum ($\delta_{min}$) and minimum ($\delta_{max}$) end stop limits and an instantaneous position ($\delta_{inst}$) from said at least one input sensor.

7. A method of claim 1 wherein said at least one input sensor comprises a deflection sensor.

8. A method of claim 5 wherein said instantaneous relative velocity ($V_{inst}$) is derived based upon an output signal from said deflection sensor.

9. A method of claim 1 including an additional step of scaling an absolute value of said error (e) by said instantaneous relative velocity ($V_{inst}$).

10. A method of claim 1 including an additional step of scaling said error (e) by a square of said instantaneous relative velocity ($V_{inst}$).

11. An end stop control method, comprising the steps of:
(a) determining an instantaneous relative displacement ($\delta_{inst}$) based upon a sensor output from at least one sensor,
(b) setting a snubbing zone (Z) adjacent to an end stop limit,
(c) determining whether said instantaneous relative displacement ($\delta_{inst}$) is within said snubbing zone (Z),
(d) determining a snubber intrusion distance ($\delta_z$) which represents an distance of intrusion into said snubber zone (Z) from a point of first entry into said zone (Z),
(e) calculating a snubber control signal ($V_{snub}$) based at least in part upon a continuous function of said snubber intrusion distance ($\delta_z$),
(f) providing said snubber control signal ($V_{snub}$) to an output device, and
(g) continuously repeating steps (a) and (c) through (f).

12. A method of claim 11 including an additional step of setting said snubber control signal ($V_{snub}$) to zero when not within said snubbing zone (Z).

13. A method of claim 11 wherein said continuous function is a linear function of said snubber instrusion distance ($\delta_z$).

14. A method of claim 11 wherein said continuous function is a second order function of said snubber instrusion distance ($\delta_z$).

15. A method of claim 11 including an additional step of determining an instantaneous relative velocity ($V_{inst}$) and wherein said snubber control signal ($V_{snub}$) is at least in part calculated based upon said instantaneous relative velocity ($V_{inst}$).

16. A method of claim 11 wherein said snubber control signal ($V_{snub}$) is at least in part calculated based upon a control gain setting ($\sigma$).

17. A method of claim 11 further comprising a step of setting said snubbing zone (Z) based upon a parameter $\Delta$ which is a predetermined percentage of a displacement range (DR), where DR=$\delta_{max}$-$\delta_{min}$, $\delta_{max}$ being a maximum displacement at an upper end stop and $\delta_{min}$ being a minimum displacement at a lower end stop.

18. A method of claim 11 wherein said snubber control signal ($V_{snub}$) is added to a primary control signal ($V_{primary}$) derived from a primary control method.

19. A method of claim 11 wherein said snubber control signal ($V_{snub}$) is added to an end stop control signal ($V_{end\ stop}$) derived from an end stop control method.

20. A method of claim 11 wherein said snubber control signal ($V_{snub}$) is added to a end stop control signal ($V_{end\ stop}$) derived from an end stop control method and to a primary control signal ($V_{primary}$) derived from a primary control method to derive an overall control signal ($V_{overall}$).

21. A method of claim 11 including an additional step of deriving a distance ($\delta_s$) to said snubbing zone (Z) by obtaining end stop limits ($\delta_{max}$ and $\delta_{min}$) and an instantaneous relative displacement ($\delta_{inst}$) from said at least one sensor.

22. A method of claim 11 comprising a preliminary step of determining a total displacement range (DR) based upon a maximum end stop limit ($\delta_{max}$) and a minimum end stop limit ($\delta_{min}$) determined during a calibration procedure from said at least one sensor, where DR=$\delta_{max}$-$\delta_{min}$.

23. A method of claim 22 wherein a predetermined parameter $\Delta$ is set as a percentage of said total displacement range (DR).

24. A method of claim 23 wherein said percentage is in range of between 10% and 30% of said total displacement range (DR).

25. A method of claim 22 wherein a determination of whether said instantaneous relative displacement ($\delta_{inst}$) is operating within said snubbing zone (Z) is determining by deriving a snubber distance ($\delta_s$) before an incursion into said snubbing zone (Z), where $\delta_s = \delta_{end} - \Delta$.

26. An end stop control method, comprising the steps of:
(a) determining an instantaneous relative displacement ($\delta_{inst}$),
(b) determining an instantaneous relative velocity ($V_{inst}$),
(c) calculating an error value (e) based at least in part upon a square of said instantaneous relative velocity ($V_{inst}$),
(d) calculating an end stop value (V end stop) based upon said error value (e), if said error value (e) is positive,
(e) setting a snubbing zone (Z) adjacent to an end stop limit,
(f) determining whether said instantaneous relative displacement ($\delta_{inst}$) is within said snubbing zone (Z),
(g) determining a snubber instrusion distance ($\delta_z$) which represents an distance of intrusion into said snubber zone (Z) from a point of first entry into said zone (Z),
(h) calculating a snubber control signal ($V_{snub}$) based at least in part upon a continuous function of said snubber intrusion distance ($\delta_z$),
(i) providing said snubber control signal ($V_{snub}$) and said end stop control signal ($V_{end\ stop}$) to an output device, and
(j) continuously repeating steps (a) through (d) and (f) through (i).

\* \* \* \* \*